(12) United States Patent
Bayrakeri (10) Patent No.: US 6,388,680 B1
(45) Date of Patent: May 14, 2002

(54) MULTI-USER EXTENSION MECHANISMS FOR CLIENT-SERVER SYSTEM

(75) Inventor: Sadik Bayrakeri, Foster City, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/176,101

(22) Filed: Oct. 21, 1998

Related U.S. Application Data
(60) Provisional application No. 60/091,122, filed on Jun. 29, 1998.

(51) Int. Cl.[7] ............................................. G06F 15/00
(52) U.S. Cl. ..................... 345/744; 345/764; 345/733
(58) Field of Search ................. 345/330, 331, 345/333, 334, 335, 339, 346, 753, 751, 762, 765, 744, 808, 764; 709/201, 202, 213, 214, 231

(56) References Cited

U.S. PATENT DOCUMENTS

| | | | | |
|---|---|---|---|---|
| 5,008,853 A | * | 4/1991 | Bly et al. ..................... | 345/331 |
| 5,339,388 A | * | 8/1994 | Bates et al. .................. | 345/354 |
| 5,594,859 A | * | 1/1997 | Palmer et al. ............... | 345/330 |
| 5,953,506 A | * | 9/1999 | Kalra et al. .................. | 709/231 |
| 5,995,096 A | * | 11/1999 | Kitahara et al. ............ | 345/330 |

OTHER PUBLICATIONS

Carey, R., and Bell, G., "The Annotated VRML 2.0 Reference Manual," Addison–Wesley Developers Press, 1997, title page, reference/disclosure page, and pp. 183–184.

"Living Worlds," printed from Internet web–site www.livingworlds.com on Jan. 19, 1998.

Eleftheriadis, et al., Text for CD 14496–1 Systems, ISO/IEC JTC1/SC29/WG11 N1901, Nov. 21, 1997.

Koenen, R., MPEG–4 Overview—(Dublin Version), ISO/IEC JTC1/SC29/WG11 N2323, Jul. 1998, Dublin.

Väänänen, R., Working Draft of Advanced BIFS (Systems WD subpart 2), ISO/IECJTC1/SC29/WG11 MPEG98/N2358 subpart 2, Jul. 1998.

Document: Väänänen, R., Verification Model of Advanced BIFS (Systems VM subpart 2), ISO/IEC JTC1/SC29/WG11 MPEG98/N2359 subpart 2, Jul. 1998.

\* cited by examiner

*Primary Examiner*—Raymond J. Bayerl
*Assistant Examiner*—Cao H. Nguyen
(74) *Attorney, Agent, or Firm*—Finnegan, Henderson, Farabow, Garrett & Dunner, L.L.P.

(57) ABSTRACT

Multi-user communication of multimedia content in a client-server system is provided by dividing a client's scene into non-shared and shared parts. In one embodiment, the non-shared parts of the scene are organized into one or more MPEG-4 Group nodes. The shared parts of the scene are organized into one or more multi-user group nodes, each of which is an extension of an MPEG-4 Group node. In addition to the functionality provided by an MPEG-4 Group node, a multi-user group node provides boolean exposed fields that act as switches to control initiation of interaction, update control, privacy, and object accessibility.

12 Claims, 5 Drawing Sheets

MULTI-USER EXTENSION MECHANISMS FOR CLIENT-SERVER SYSTEM

RELATED APPLICATIONS

The following identified U.S. patent applications are relied upon and are incorporated by reference in this application:

Provisional U.S. Patent Application No. 60/091,122 Expired, entitled "Multi-User Interaction Protocol Using Java and MPEG-4," filed on Jun. 29, 1998, by Sadik Bayrakeri;

U.S. Patent Application Ser. No, 09/176,100, entitled "MULTI-USER INTERACTION FOR MULTIMEDIA COMMUNICATION," filed on Oct. 16,1998 by Sadik Bayrakeri, and U.S. patent application Ser. No. 09/176,100, entitled "METHOD AND APPARATUS FOR IMPLEMENTING MULTI-USER GROUPING NODES IN A MULTIMEDIA PLAYER," and filed on the same date herewith by Tao Liang, Sadik Bayrakeri, and Jing Swales.

The disclosures of these applications are each incorporated herein by reference in their entirety. In addition, the benefit of priority of Provisional U.S. Patent Application No. 60/091122 is hereby claimed under 35 U.S.C. 119(e).

BACKGROUND OF THE INVENTION

A. Field of the Invention

This invention relates generally to multi-user communication, and, more particularly, to multi-user extension mechanisms for a client-server system.

B. Description of the Related Art

The Moving Picture Experts Group (MPEG) is a working group of the International Organization for Standardization (ISO) that generates standards for digital video and audio compression. MPEG-1 and MPEG-2 are standards for interactive video on CD-ROM and Digital Television, respectively. MPEG4 is a newly emerging standard being designed for efficient multimedia delivery and integration between a client and a server. MPEG-4 provides the flexibility to allow an end user to interact with multimedia content (e.g., audio, video, text, or any combination thereof) and to control the way that audiovisual objects are displayed. A more complete description of MPEG-4 is contained in the document ISO/IEC JTC1/SC29/WG11, N2323, published July, 1998, by the ISO.

MPEG-4 incorporates aspects of the well known Virtual Reality Modeling Language (VRML), which describe three dimensional objects and worlds using a hierarchical scene graph (or scene description). Entities contained within the scene graph are called nodes. [The terms "scene graph" and "scene description" are used interchangeably herein. VRML is described more fully in various texts, such as "The Annotated VRML 2.0 Reference Manual," by Rikk Carey and Gavin Bell, Addison-Wesley Developers Press (1997)]. VRML 2.0 defines 54 different node types, including geometry primitives, appearance properties, sound properties, and various types of grouping nodes. Nodes store their data in fields, and VRML defines 20 different types of fields. Furthermore, nodes can contain other nodes and may be contained in more than one node. Analogously, MPEG-4 employs an MPEG-4 scene description and MPEG-4 nodes (sometimes called Binary Format for Scene (BIFS) nodes).

Two of the node types defined in MPEG-4 and VRML 2.0 are the Group and the Group2D nodes. Both the Group and Group2D nodes are mechanisms by which one associates different media objects into a scene description. One limitation of MPEG-4 and VRML is that these Group and Group2D nodes are designed for a single end user, and therefore do not provide mechanisms for multi-user interaction. Multi-user interaction, however, is important for application domains such as collaborative computing, distance learning, shared virtual worlds, virtual chat, entertainment, and e-commerce, each of which involve interaction of two or more users with each other. There exists, therefore, a need for multi-user extension mechanisms for a client-server system.

SUMMARY OF THE INVENTION

Methods and apparatus consistent with the present invention, as embodied and broadly described herein, provide multi-user communication in a client-server system.

Consistent with the invention, a method for providing multi-user communication in a client-server system includes dividing a scene description at a first client into shared parts and non-shared parts and organizing the shared parts of the scene description into at least one multi-user group node.

Consistent with the invention, an apparatus for providing multi-user communication in a client-server system includes at least one memory having program instructions, and at least one processor configured to execute the program instructions. The processor executes the program instructions to perform the operations of providing a MultiUser Group node. The MultiUser Group node includes the following: a boolean expression field to control whether changes to the state of the group node at the first client should be communicated to a second client; a boolean expression field to control whether changes to the state of the group node should be implemented in a second client; a boolean expression field to control authorization to modify the group node by a second client; and a boolean expression field to control access to the group node by a second client.

Consistent with the invention, a computer-readable medium includes instructions for controlling a computer system to perform a method for providing multi-user communication in a client-server system . The method includes dividing a scene description at a first client into shared parts and non-shared parts and organizing the shared parts of the scene description into at least one multi-user group node.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an embodiment of the present invention as illustrated in the accompanying drawings. The same reference numbers may be used throughout the drawings and the following description to refer to the same or like parts.

A. Overview

Methods and apparatus consistent with the invention provide multi-user communication of multimedia content by dividing a client's scene into non-shared and shared parts. In one embodiment, the non-shared parts of the scene are organized into one or more single-user group nodes, with which other clients cannot interact. [As used herein, the term "single-user group node" refers to a node that does not support multi-user communication, such as an MPEG-4 Group (or Group2D) node or a VRML Group (or Group2D) node. The term "multi-user group node" refers to an extended single-user group node, consistent with the invention. Although the description contained herein is based on nodes, those skilled in the art will recognize that other object based scene descriptions can be used consistent with the invention.]

B. Architecture

Figure 1:
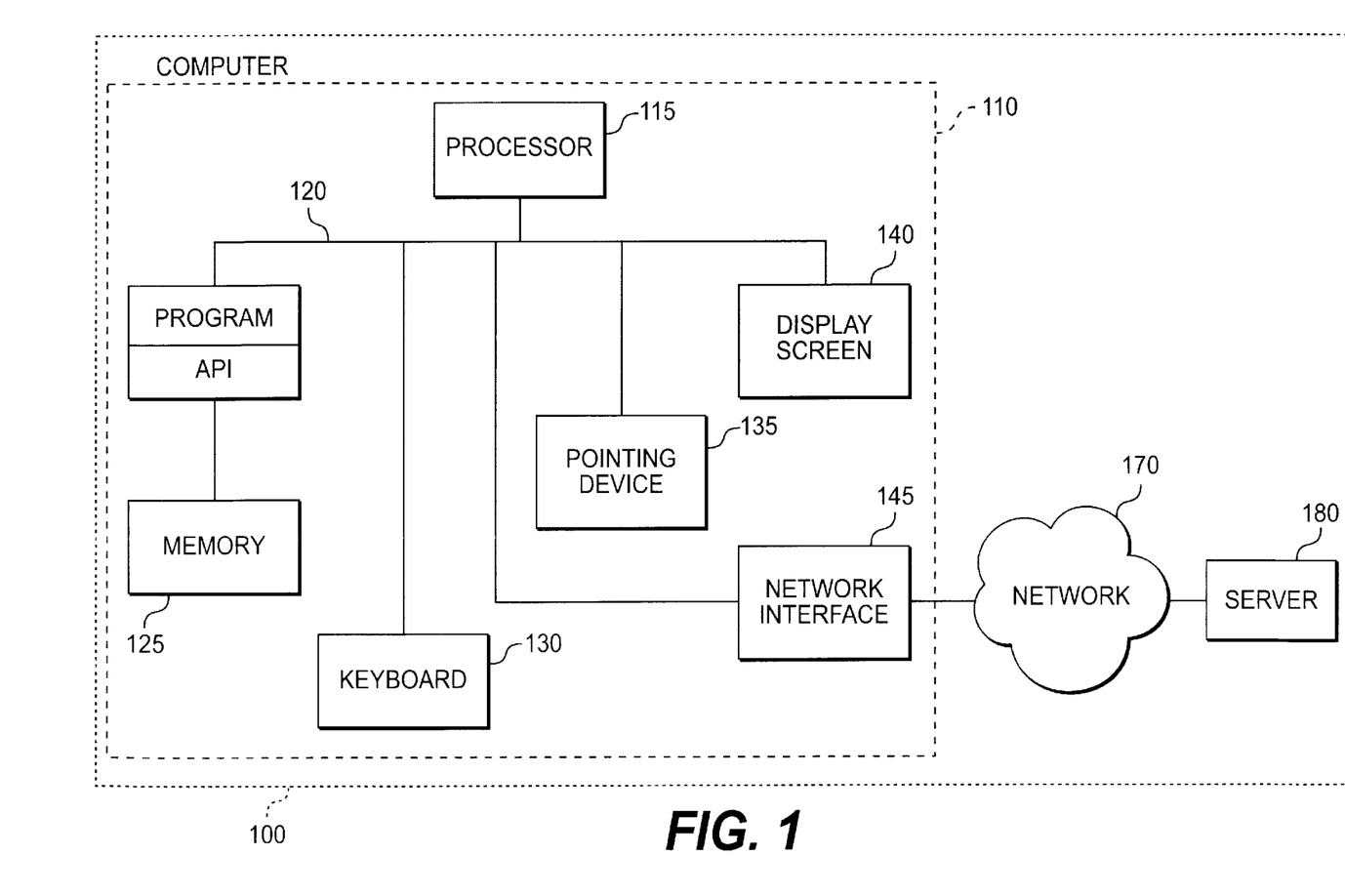
FIG. 1 is a block diagram of a computer system in which methods and apparatus consistent with the invention may be implemented.

FIG. 1 is a block diagram of a computer system 100 in which methods and apparatus consistent with the invention can be implemented. System 100 comprises a computer 110 connected to a server 180 via a network 170. Network 170 can be, for example, a local area network (LAN), a wide area network (WAN), or the Internet. System 100 is suitable for use with the Java™ programming language, although one skilled in the art will recognize that methods and apparatus consistent with the invention can be applied to other suitable user environments.

Computer 110 comprises several components that are all interconnected via a system bus 120. Bus 120 can be, for example, a bi-directional system bus that connects the components of computer 110, and contains thirty-two address lines for addressing a memory 125 and a thirty-two bit data bus for transferring data among the components. Alternatively, multiplex data/address lines can be used instead of separate data and address lines. Computer 110 communicates with other users' computers on network 170 via a network interface 145, examples of which include Ethernet or dial-up telephone connections.

Computer 110 contains a processor 115 connected to a memory 125. Processor 115 can be a microprocessor manufactured by Motorola, such as the 680X0 processor, a processor manufactured by Intel, such as the 80X86 or Pentium processors, or a SPARC™ microprocessor from Sun Microsystems, Inc. However, any other suitable microprocessor or micro-, mini-, or mainframe computer, can be used. Memory 125 can include a RAM, a ROM, a video memory, or mass storage. The mass storage can include both fixed and removable media (e.g., magnetic, optical, or magnetic optical storage systems or other available mass storage technology). Memory 125 can include a program, an application programming interface (API), and a virtual machine (VM) that contains instructions for handling constraints, consistent with the invention.

A user typically provides information to computer 110 via a keyboard 130 and a pointing device 135, although other input devices can be used. In return, information is conveyed to the user via display screen 140.

C. Architectural Operation

In one embodiment, methods and apparatus consistent with the invention employ an extension of the following two single-user group nodes (which are described in more detail in "The Annotated VRML 2.0 Reference Manual," by Rikk Carey and Gavin Bell, Addison-Wesley Developers Press (1997)):

```
Group {
    eventIn         MFNode      addChildren         NULL
    eventIn         MFNode      removeChildren      NULL
    exposedField    MFNode      children            NULL
    field           SFVec2f     bboxCenter          0,0,0
    field           SFVec2f     bboxSize            -1,-1,-1
}
Group2D {
    eventIn         MFNode      addChildren         NULL
    eventIn         MFNode      removeChildren      NULL
    exposedField    MFNode      children            NULL
    field           SFVec2f     bboxCenter          0,0
    field           SFVec2f     bboxSize            -1,-1
}
```

In each of these single-user group nodes, the fields identified above perform the following functions:

addChildren eventIn: This field specifies a list of objects that must be added to the Group node.

removeChildren eventIn: This field specifies a list of objects that must be removed from the Group node.

children: This field contains the current list of objects contained in the Group node     bboxCenter: This field specifies the center of the bounding box.

bboxSize: This field specifies the dimensions (in length, width, and/or height) of the bounding box. [It is possible not to transmit the bboxCenter and bboxSize fields, but if they are transmitted they should contain all children of the group node.]

If more than one user desires to interact with a single scene, however, these single-user group nodes are insufficient because they provide no mechanism for concurrency control or access control. These deficiencies can be overcome, consistent with the invention, by creating two new types of group nodes. Any client may create a group node of either of these two types and transmit a copy ("replica") of the new type group node to other clients. The new type group nodes can have control mechanisms for supporting multi-user communication, as shown by the following examples:

```
MultiUserGroup {
    eventIn         MFNode      addChildren         NULL
    eventIn         MFNode      removeChildren      NULL
    exposedField    MFNode      children            NULL
    exposedField    SFBool      isInitiator         TRUE
    exposedField    SFBool      isActive            TRUE
    exposedField    SFBool      isPrivate           TRUE
    exposedField    SFBool      isAccessible        TRUE
    field           SFVec2f     bboxCenter          0,0,0
    field           SFVec2f     bboxSize            -1,-1,-1
}
MultiUserGroup2D {
    eventIn         MFNode      addChildren         NULL
    eventIn         MFNode      removeChildren      NULL
    exposedField    MFNode      children            NULL
    exposedField    SFBool      isInitiator         TRUE
    exposedField    SFBool      isActive            TRUE
    exposedField    SFBool      isPrivate           TRUE
    exposedField    SFBool      isAccessible        TRUE
    field           SFVec2f     bboxCenter          0,0
    field           SFVec2f     bboxSize            -1,-1
}
```

In each of these group nodes, the fields identified above perform the following functions:

addChildren eventIn: This field performs the same function as in a single-user group node.

removeChildren eventIn: This field performs the same function as in a single-user group node.

children: This field performs the same function as in a single-user group node.

isInitiator: This field indicates whether a client is the initiator for the group node. If this field is set to FALSE, any state changes made to the group node by the client in which it resides need not be transmitted to other clients. If this field is set to TRUE, the group node on this client is an initiator; accordingly, any state changes to its state must be transmitted to other clients. It is possible to set the isInitiator field to TRUE in more than one client. In such cases, the application program shall handle the distribution of state changes from multiple initiators to replicas.

isActive: This field indicates whether a client should implement any state changes for the node which are received from other clients, and also whether state changes for the node occurring on this client should be transmitted to other clients. If this field is set to TRUE in a client node, any node state changes received by the client from other clients will be implemented in the node residing on this client. If this field is set to FALSE, any received state changes will not be implemented. Furthermore, if this field is set to FALSE and the isInitiator field is set to TRUE, any state changes for the node occurring on this client are not transmitted to other clients.

isPrivate: This field indicates who is allowed to modify the group node. If this field is set to TRUE, only the owner of the group node may modify the group node's content. If this field is set to FALSE, other users can also modify the group node's content.

isAccessible: This field indicates who is allowed to access the group node. If this field is set to FALSE, only the owner (i.e., the creator client) of the group node can access/read the group node. If this field is set to TRUE, other clients can also access the group node's content.

bboxCenter: This field performs the same function as in a single-user group node.

bboxSize: This field performs the same function as in a single-user group node.

Figure 2:
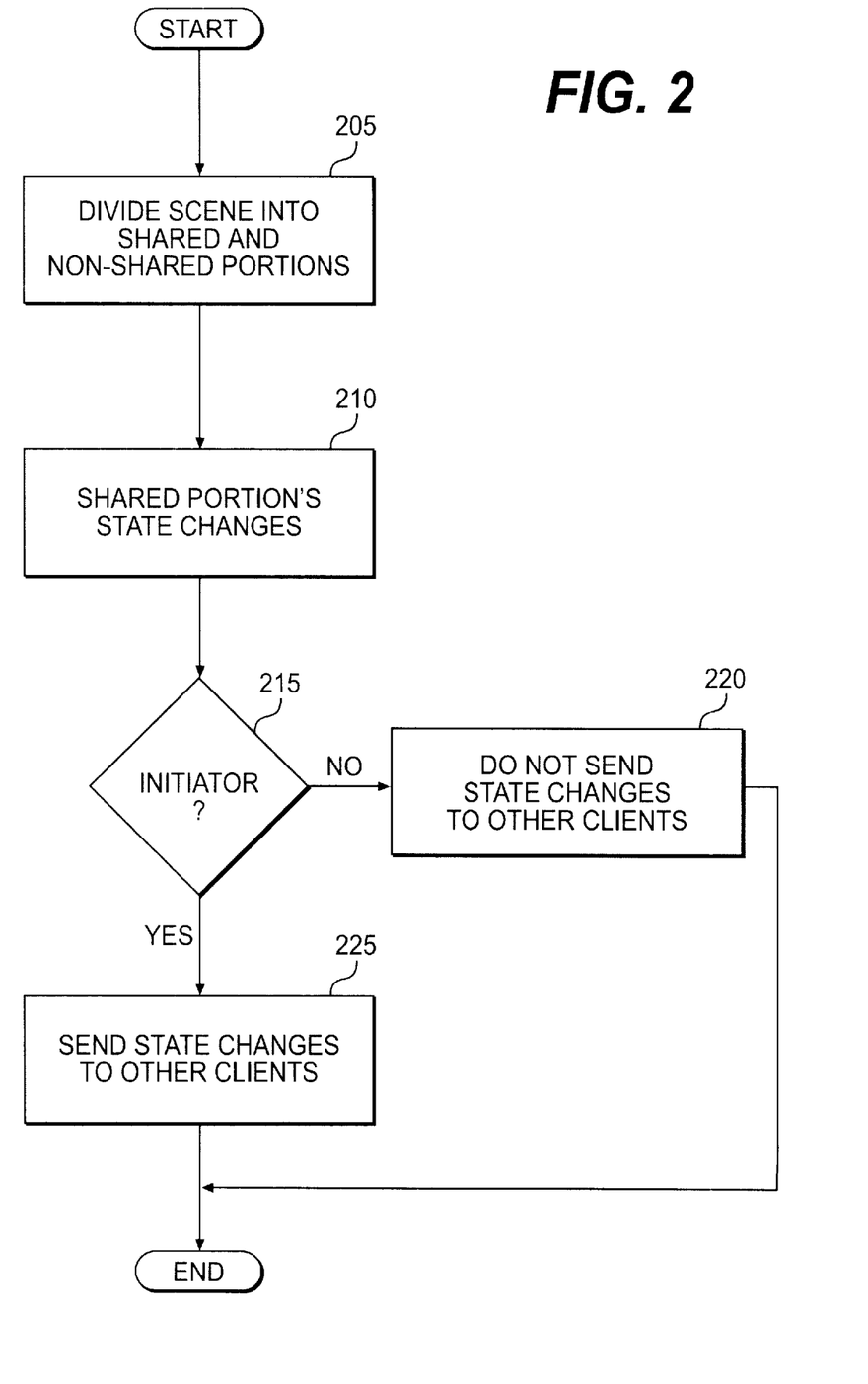
FIG. 2 is a flow diagram of a method for an initiator control mechanism consistent with the invention.

FIG. 2 is a flow diagram of a method for an initiator control mechanism consistent with the invention. In one embodiment, a multimedia scene is created on a user's client terminal using VRML or MPEG-4. At stage 205, the multimedia scene is divided into shared and non-shared parts. This can be accomplished, for example, by using a BIFS mechanism. The shared part of a client's scene includes MultiUseGroup nodes with which multiple user clients can interact. [Although the description for FIGS. 2–5 uses the terminology described above in reference to MultiUserGroup, those skilled in the art will appreciate that the names are explanatory only and that other multi-user group nodes or objects may be used consistent with the invention.] The non-shared part of the client's scene contains single-user group nodes that belong only to that client The client that creates the nodes may be known as the "owner" of the nodes.

At stage 210, the state of a MultiUserGroup node on a client changes. At stage 215, it is determined whether the changes should be transmitted to replicas of the MultiUserGroup node which exist on other clients. This can be accomplished by using the isInitiator boolean field, as described above. If the client is not an initiator for the MultiUserGroup node (e.g., the isInitiator field is FALSE), any state changes made at that client to the node present at that client (either original node or replica node) are not transmitted to other clients at stage 220. If the client is an initiator for the MultiUserGroup node (e.g., the isInitiator field is TRUE), then the state changes are sent to other clients at stage 225.

Figure 3:
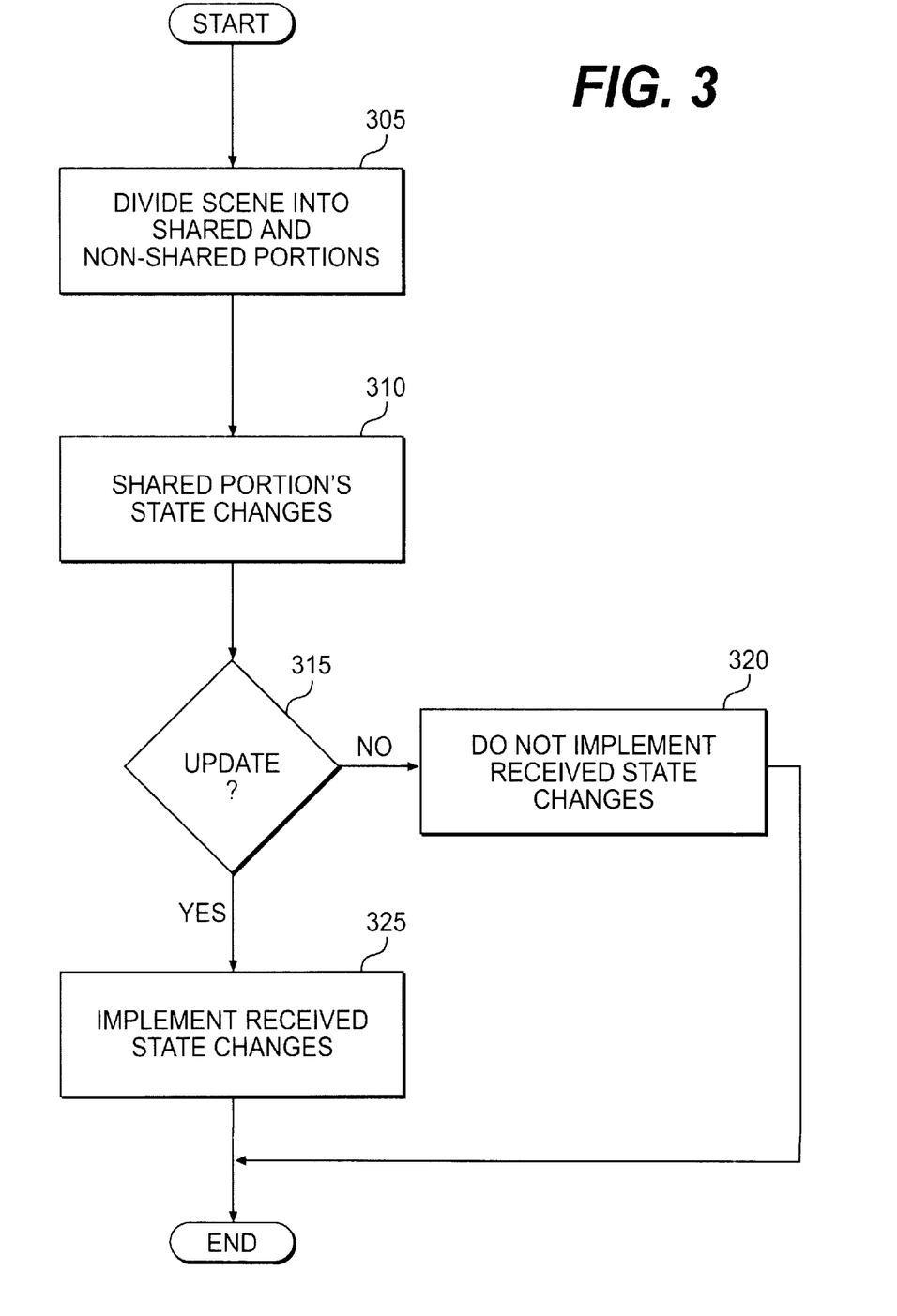
FIG. 3 is a flow diagram of a method for an update control mechanism consistent with the invention.

FIG. 3 is a flow diagram of a method for an update control mechanism consistent with the invention. In one embodiment, a scene is divided into shared and non-shared parts at stage 305 as described above in reference to FIG. 2. At stage 310, the state of a MultiUserGroup node changes on a client. At stage 315, it is determined whether the state change of the MultiUserGroup node should be transmitted to other clients and whether such other clients will implement a received state change on their node. This can be accomplished by using (in addition to the isInitiator field) the isActive boolean field, as described above. If the MultiUserGroup node is not active for certain clients (e.g., the isActive field is FALSE), those clients will not implement any received state changes for that node at stage 320. If the MultiUserGroup node is active for certain clients (e.g., the isActive field is TRUE), state changes received by those clients will be implemented at stage 325.

Figure 4:
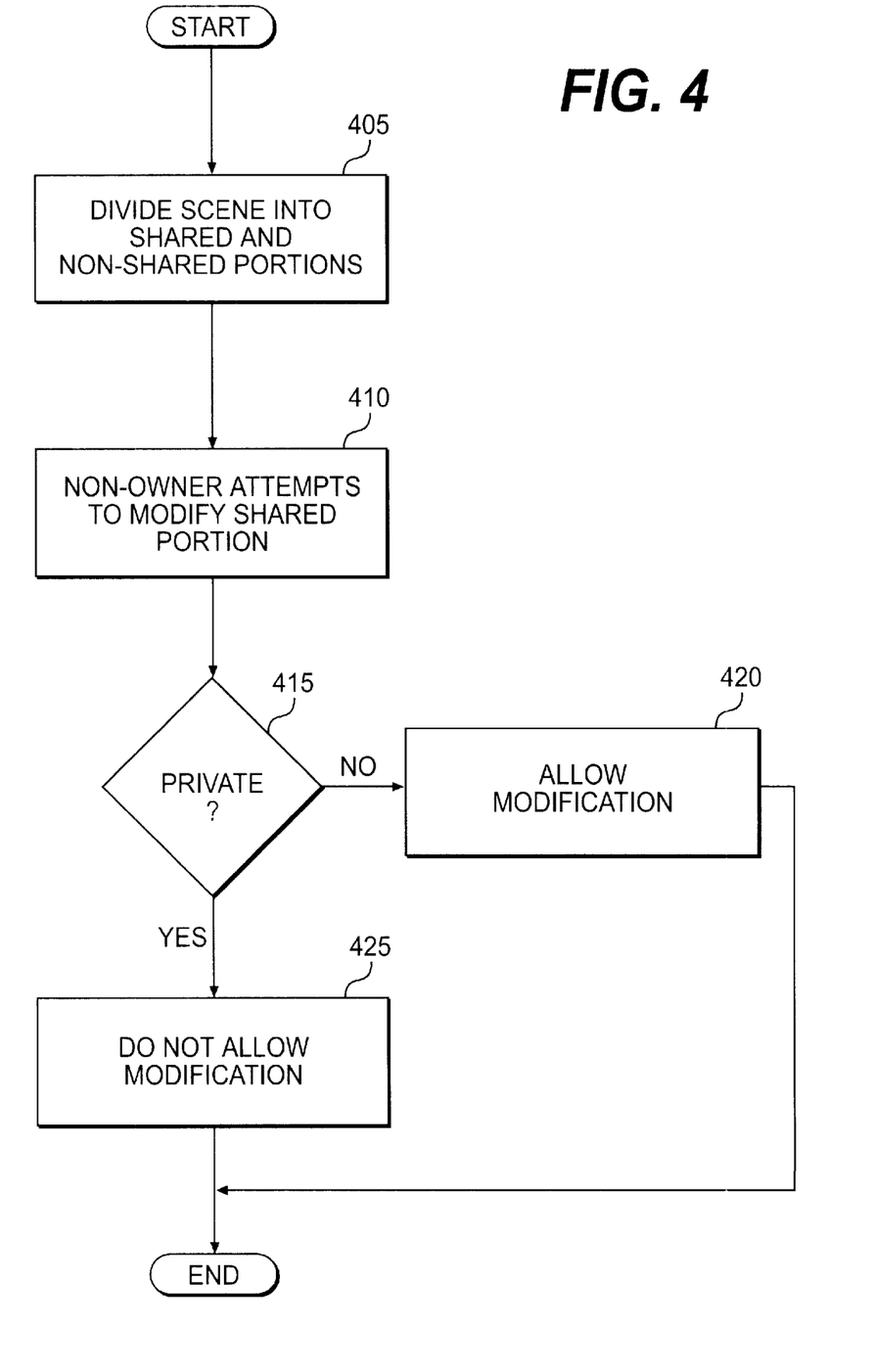
FIG. 4 is a flow diagram of a method for a privacy control mechanism consistent with the invention.

FIG. 4 is a flow diagram of a method for a privacy control mechanism consistent with the invention. In one embodiment, a scene is divided into shared and non-shared parts at stage 405 as described above in reference to FIG. 2. At stage 410, a client other than the owner of the MultiUserGroup node attempts to modify the MultiUserGroup node. At stage 415, it is determined whether the non-owner should be permitted to modify the MultiUserGroup node. This can be accomplished by using the isPrivate boolean field, as described above. If other clients are permitted to modify the MultiUserGroup node (e.g., the isPrivate field is FALSE), then the non-owner is permitted to modify the content of the MultiUserGroup node at stage 420. If only the owner may modify the MultiUserGroup node (e.g., the isPrivate field is TRUE), then the non-owner is not permitted to modify (i.e., is precluded from modifying) the content of the MultiUserGroup node at stage 425.

Figure 5:
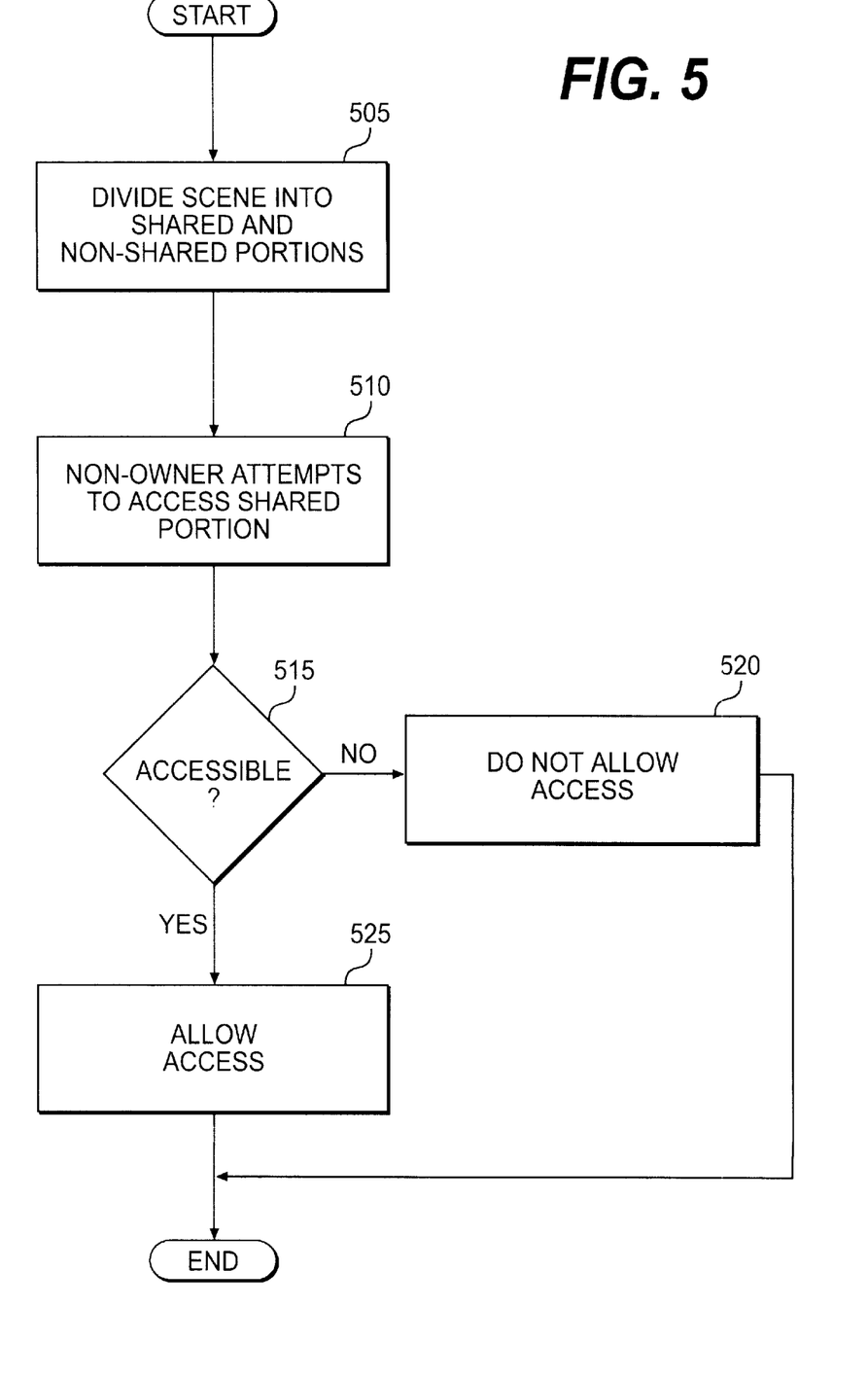
FIG. 5 is a flow diagram of a method for an accessibility control mechanism consistent with the invention.

FIG. 5 is a flow diagram of a method for an accessibility control mechanism consistent with the invention. In a preferred implementation, a scene is divided into shared and non-shared parts at stage 505 as described above in reference to FIG. 2. At stage 510, a client other than the owner of the MultiUserGroup node attempts to access/read the MultiUserGroup node. At stage 515, it is determined whether the non-owner should be permitted to access/read the MultiUserGroup node. This can be accomplished by using the isAccessible boolean field, as described above. If only the owner of the MultiUserGroup can access it (e.g., the isAccessible field is FALSE), then the non-owner is not permitted to access/read the content of the MultiUserGroup node at stage 520. If other clients are permitted to access/read the MultiUserGroup node (e.g., the isAccessible field is TRUE), then the non-owner is permitted to access/read the content of the MultiUserGroup node at stage 525.

D. Conclusion

As described in detail above, methods and apparatus consistent with the invention provide multi-user communication in a client-server system. The foregoing description of an implementation of the invention has been presented for purposes of illustration and description. Modifications and variations are possible in light of the above teachings or may be acquired from practicing the invention.

For example, the foregoing description is based on extensions to MPEG-4 or VRML scene descriptions and nodes, but those skilled in the art will recognize that other programming environments (e.g., object based scene descriptions) can be used consistent with the invention. Furthermore, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for providing multi-user communication in a client-server system having multiple clients, comprising:
    dividing a scene description displayed at a first client into shared parts and non-shared parts;
    organizing the shared parts of the scene description into at least one multi-user group node;
    wherein the operation of organizing the shared parts of the scene description into at least one multi-user group node includes:
        creating a multi-user group node at the first client by adding control mechanisms to a group node, and
        adding the shared parts of the scene description to the multi-user group node; and
        wherein the creating operation comprises adding to the single-user group node a field to control whether changes to the state of the node at the first client should be communicated to a second client.

2. The method of claim 1, wherein the operation of adding to the group node a field to control whether changes to the state of the group node at the first client should be communicated to a second client comprises adding to an MPEG-4 Group node a boolean expression field to control whether changes to the state of the group node at the first client should be communicated to a second client.

3. The method of claim 1, wherein the operation of adding to the group node a field to control whether changes to the state of the group node at the first client should be communicated to a second client comprises adding to an MPEG-4 Group2D node a boolean expression field to control whether changes to the state of the group node at the first client should be communicated to a second client.

4. A method for providing multi-user communication in a client-server system having multiple clients, comprising:
    dividing a scene description displayed at a first client into shared parts and non-shared parts;
    organizing the shared parts of the scene description into shared parts and non-shared parts; and
    permitting a second client to interact with the shared parts of the scene description;
    wherein the operation for organizing the shared parts of the scene description into a multi-user group node includes:
        creating a multi-user group node at the first client by adding control mechanisms to a group node, and
        adding the shared parts of the scene description to the multi-user group node; and
        wherein the creating operation comprises adding to the group node a field to control whether changes to the state of the group node should be implemented in a second client.

5. The method of claim 4, wherein the operation of adding to the group node a field to control whether changes to the state of the group node should be implemented in a second client comprises adding to an MPEG-4 Group node a boolean expression field to control whether changes to the state of the group node should be implemented in a second client.

6. The method of claim 4, wherein the operation of adding to the group node a field to control whether changes to the state of the group node should be implemented in a second client comprises adding to an MPEG-4 Group2D node a boolean expression field to control whether changes to the state of the group node should be implemented in a second client.

7. A method for providing multi-user communication in a client-server system having multiple clients, comprising:
    providing a MultiUser Group node comprising:
        a boolean expression field to control whether changes to the state of the group node at the first client should be communicated to a second client;
        a boolean expression field to control whether changes to the state of the group node should be implemented in a second client;
        a boolean expression field to control authorization to modify the group node by a second client; and
        a boolean expression field to control access to the group node by a second client.

8. The method of claim 7, further comprising:
    an addChildren field;
    a removeChildren field;
    a children field;
    a bboxCenter field;
    a bboxSize field.

9. An apparatus for providing multi-user communication in a client-server system, comprising:
    at least one memory having program instructions, and
    at least one processor configured to execute the program instructions to perform the operations of:
        providing a MultiUser Group node comprising:
            a boolean expression field to control whether changes to the state of the group node at the first client should be communicated to a second client;
            a boolean expression field to control whether changes to the state of the group node should be implemented in a second client;
            a boolean expression field to control authorization to modify the group node by a second client; and
            a boolean expression field to control access to the group node by a second client.

10. A computer-readable medium containing instructions for controlling a computer system to perform a method for providing multi-user communication in a client-server system, the method comprising:
    providing a MultiUser Group node comprising:
        a boolean expression field to control whether changes to the state of the group node at the first client should be communicated to a second client.
        a boolean expression field to control whether changes to the state of the group node should be implemented in a second client;
        a boolean expression field to control authorization to modify the group node by a second client; and
        a boolean expression field to control access to the group node by a second client.

11. A computer-readable medium containing a data structure for providing multi-user communication in a client-server system, the data structure comprising:
a MultiUser Group node comprising:
a boolean expression field to control whether changes to the state of the group node at the first client should-be communicated to a second client.
a boolean expression field to control whether changes to the state of the group node should be implemented in a second client;
a boolean expression field to control authorization to modify the group node by a second client; and
a boolean expression field to control access to the group node by a second client.

12. An apparatus for providing multi-user communication in a client-server system, comprising:
means for providing a MultiUser Group node comprising:
a boolean expression field to control whether changes to the state of the group node at the first client should be communicated to a second client.
a boolean expression field to control whether changes to the state of the group node should be implemented in a second client;
a boolean expression field to control authorization to modify the group node by a second client; and
a boolean expression field to control access to the group node by a second client.

* * * * *

UNITED STATES PATENT AND TRADEMARK OFFICE
CERTIFICATE OF CORRECTION

PATENT NO. : 6,388,680 B1
DATED : May 14, 2002
INVENTOR(S) : Sadik Bayrakeri

It is certified that error appears in the above-identified patent and that said Letters Patent is hereby corrected as shown below:

Column 8,
Line 60, "client." should read -- client; --.

Column 9,
Line 7, "should-be" should read -- should be --
Line 7, "client." should read -- client; --.

Column 10,
Line 6, "client." should read -- client; --.

Signed and Sealed this

Eighth Day of October, 2002

Attest:

JAMES E. ROGAN
Attesting Officer
Director of the United States Patent and Trademark Office